June 28, 1966  A. KEEL  3,257,960
HYDRAULIC PUMPS
Filed Jan. 21, 1964
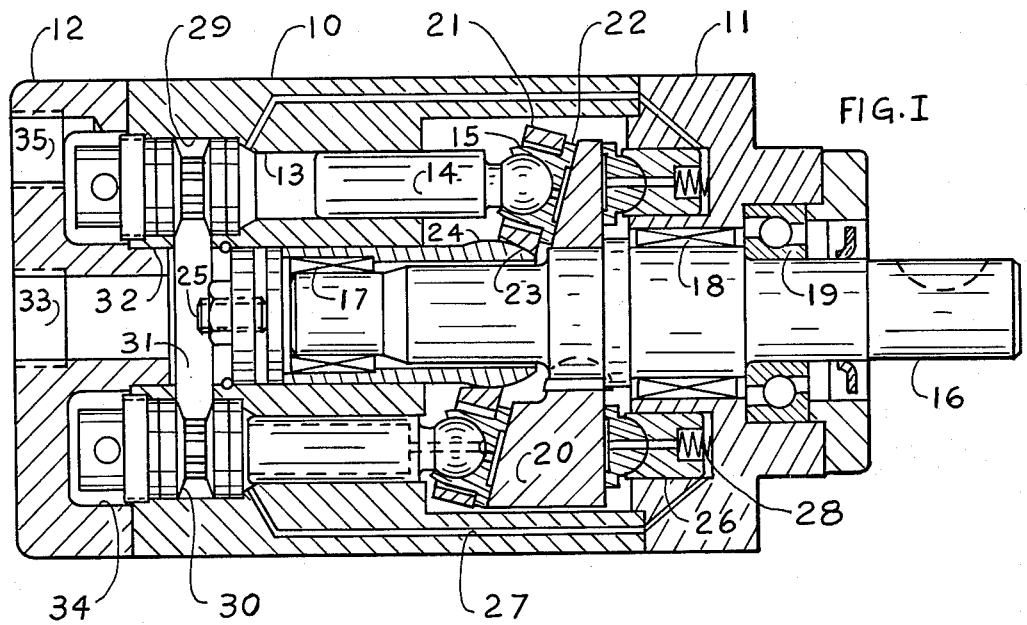
FIG. I
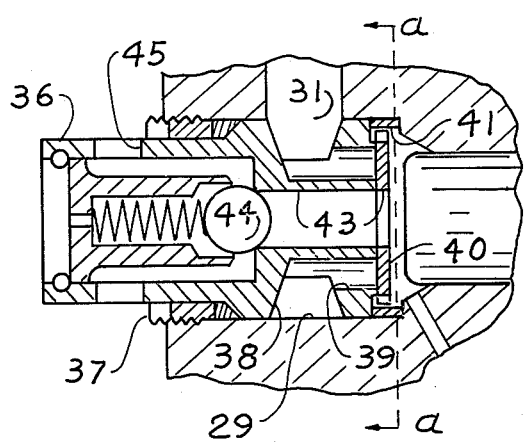
FIG. II
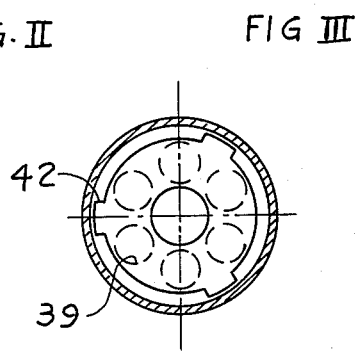
FIG III
INVENTOR
Adolf Keel United States Patent Office 3,257,960
Patented June 28, 1966

3,257,960
HYDRAULIC PUMPS
Adolf Keel, 164 California Ave., Highland Park, Mich.
Filed Jan. 21, 1964, Ser. No. 339,159
5 Claims. (Cl. 103—173)

The invention relates to hydraulic pumps, and applies more particularly to those pumps employing axial pistons actuated by a rotating cam or wobble plate, and using check valves to govern the flow of fluid to and from the individual cylinder bores.

It is the principal object of this invention to provide a reliable fluid pressure generator of this type capable of operating at high pressures over long periods of time, and so constructed as to permit economical production of the unit.

One object of the invention is the elimination of large magnitude thrust loads on the drive shaft bearings. This is accomplished by absorbing the thrust loads imposed by the pumping pistons on the wobble plate thru a series of fluid pressure responsive balancing pistons disposed in the pump housing and acting in opposition to the pumping pistons. As a result of this arrangement the drive shaft bearings need absorb only the transverse forces acting upon the wobble plate, and can be chosen much smaller for comparable operating pressures than in a conventional design.

Another object of the invention is to provide simple, positive, and adjustable means for holding the reciprocating pumping pistons against the rotating wobble plate. Springs which are generally used for this purpose must be so chosen as to be adequate under the most adverse operating conditions, such as cold starts, and consequently produce unnecessary friction under normal operating conditions. The method disclosed in this invention holds the piston assemblies against the wobble plate with a fixed clearance, and imposes no greater loads upon the flanges of the piston shoes and the central spherical joint than are generated by the withdrawal of the pumping pistons from the cylinder bores during the suction stroke.

Further objects of the invention are improved means of providing fluid flow to and from the pumping cylinders. Individual combination inlet and outlet check valve assemblies at the end of each cylinder bore permit low resistance flow from a groove in the central inlet port of the pump to the individual cylinder bores, as well as convenient discharge ports leading from the cylinders to a common collecting groove in a head cover secured to one end of the pump housing.

The features of the present invention are clearly illustrated in the accompanying drawing. They are discussed in detail in the following specification, and are again referred to in the appended claims.

In the drawing,

FIG. I represents a longitudinal cross-section of the pump.

FIG. II shows an enlarged longitudinal section thru one of the combination inlet and outlet check valve assemblies.

FIG. III is an end view of FIG. II in the plane a—a.

Referring now to FIG. I in the drawing, the pump illustrated shows a generally cylindrical two piece housing consisting of sections 10 and 11 which are bolted together. Also bolted to section 10 at the end opposite to section 11 is cover 12. Housing 10 is provided with axial cylinder bores 13 which accommodate the reciprocable pumping pistons 14. These pistons at one end carry the slippers 15 which are attached to the pistons by means of movable spherical joints. Drive shaft 16 is supported in the housing by the radial bearings 17 and 18, and by the thrust bearing 19. A wedge shaped cam or wobble plate 20 is secured to the drive shaft so that one face is at right angles to the drive shaft axis, whereas the second face forms an angle with the shaft axis and is used to actuate the pumping pistons. These pistons are held against the slanting actuator face of cam 20 by means of a disc 21 which fits over the piston slippers and engages flanges 22 on the piston slippers. Disc 21 is provided with a partial spherical bearing surface 23 which fits over the male spherical end portion of sleeve 24. This sleeve is slidably fitted to a central bore in housing section 10. Its axial position can be adjusted and maintained by the screw and lock nut arrangement 25.

Each of the pumping pistons 14 in housing section 10 is opposed by a balancing piston 26 in section 11 of the housing for the purpose of absorbing the axial forces imposed upon the cam by the pumping pistons. Both the pumping pistons and the balancing pistons are in sliding contact with cam 20 by means of fluid pressure balanced slippers in order to reduce friction losses to a minimum. The fluid pressure behind each balancing piston is maintained equal to that prevailing in the cylinder bore of the corresponding pumping piston by fluid passages 27. The diameter of balancing pistons 26 preferably is held slightly below that of the pumping pistons 14 so as to produce a small avial load on thrust bearing 19. Springs 28 behind balancing pistons 26 serve to maintain contact between slipper and bearing surface of the cam during the suction portion of the pumping piston stroke.

Meeting each cylinder bore 13 from the outside of housing section 10 is a valve chamber 29 which contains check valve assembly 30. Valve chambers 29 are intersected by the annular groove 31 in the central bore 32 of housing section 10 and thus are in communication with the inlet port 33 in cover 12. An annular groove 34 in cover 12 collects the discharge fluid from the check valve assemblies and establishes communication with discharge port 35 in cover 12. If it is desired not to collect the discharge of all valve assemblies into one common outlet port by means of the groove 34, this groove may be arranged to accommodate only a portion of the assemblies, and other grooves or outlets may be provided in any combination to obtain a plurality of independent outlet ports, each of which may be used to supply fluid power to a different hydraulic circuit.

The enlarged sectional view of check valve assembly 30 in FIG. II shows the valve body 36 held in position in the valve chamber by the threaded sleeve 37. The annular groove 38 on the valve body is positioned to line up with groove 31 in housing section 10. A series of axial holes 39 are drilled into valve body 36 in a circular pattern from the end facing the cylinder bore to meet with groove 38 and thus establish a fluid passage from groove 38 to the adjacent cylinder bore. A disc 40, fitted loosely to the inside diameter of spacer 41 in the valve chamber by means of three radial tongues 42, and having limited freedom of movement axially, permits free flow of fluid thru holes 39 to the cylinder bore during the suction stroke of the piston, but prevents return flow during the discharge stroke by covering the entrances to holes 39 and being held tightly against the inlet valving face of body 36. The discharge of fluid from an individual cylinder bore to the common outlet port takes place thru the central bore 43 in valve disc 40 and valve body 36 over the check valve 44 and thru holes 45 in valve body 36.

I claim the following:

1. In a hydraulic pump the combination of a housing, a drive shaft journalled therein, a wedge shaped rotatable cam mounted on said drive shaft, said cam having two plane bearing surfaces, one at right angles to the drive shaft axis, the other an actuator face forming a wedge with this first bearing surface, a plurality of axial cylinder bores on the interior of said housing facing the actuator side of the said cam, axially reciprocable piston assemblies in the said cylinder bores, said piston assemblies being in sliding contact with the actuator face of the said cam, a plurality of axially yieldable fluid pressure responsive balancing pistons disposed on the interior of the housing oppositely the said cylinder bores, one such balancing piston for each of the cylinder bores, each of such balancing pistons being in line with one of the said cylinder bores and being of substantially the same diameter as that cylinder bore, said balancing pistons being in sliding contact with the bearing face of said cam normal to the drive shaft axis, and a plurality of fluid passages, one from each of the cylinder bores to the end of its corresponding balancing piston.

2. In a hydraulic pump the combination of a housing, a drive shaft journalled therein, a rotatable cam secured to said drive shaft, said cam having a plane actuator surface not normal to the drive shaft axis, a plurality of axial cylinder bores disposed on the interior of the said housing and facing the actuator face of the said cam, axially reciprocable piston assemblies in the said cylinder bores, said piston assemblies being in sliding contact with the actuator face of said cam, a disc engaging the said piston assemblies and holding them against the actuator face of the said cam, means on said disc forming a centrally located partial female spherical bearing surface, a sleeve slidably disposed in the housing coaxial with the drive shaft and surrounding said drive shaft and containing bearing means for one end of the said drive shaft, said sleeve being provided with a male spherical end portion to engage the female spherical bearing surface of the said disc, and mechanically adjustable positive means disposed in the said housing and acting upon the said sleeve to position it so as to hold the said piston assemblies against the actuator face of the said cam by means of the said disc.

3. In a hydraulic pump the combination of a housing, a drive shaft journalled therein, a rotatable cam secured to the said drive shaft, said cam having a plane actuator face not normal to the drive shaft axis, a plurality of axial cylinder bores on the interior of the housing and facing the said actuator face of the cam, axially reciprocable piston assemblies in the said cylinder bores, said piston assemblies being in sliding contact with the actuator face of the said cam, a plurality of valve chambers in the said housing contiguous to the cylinder bores, one for each of the cylinder bores and coaxial with said cylinder bores, said valve chambers leading from the outside of the housing inward to meet the said cylinder bores and serving as chambers for check valve assemblies, a central bore in the housing coaxial with the drive shaft axis, and an annular groove in the said central bore intersecting the said valve chambers and forming a fluid passage from the central bore to the said valve chambers.

4. In a hydraulic pump of the axial piston type having one inlet port and one or more outlet ports a plurality of check valve assemblies, one of each disposed in a valve chamber contiguous to and coaxial with one of the cylinder bores of said pump, each check valve assembly providing unidirectional fluid flow from the said inlet port to an individual cylinder bore of said pump thru multiple axial passages leading from a groove on the periphery of said check valve assembly to the end thereof facing the said cylinder bore, and each check valve assembly also providing unidirectional flow from the said cylinder bore to the said common outlet port thru a central axial passage in said valve assembly.

5. In a hydraulic piston pump having an inlet port and one or more outlet ports, the combination of a housing, a drive shaft journalled therein, a wedge shaped rotatable cam carried on said drive shaft, said cam having two plane bearing surfaces, one at right angles to the drive shaft axis, the other an actuator face forming a wedge with this first bearing surface, a plurality of axial cylinder bores on the interior of the said housing facing the actuator side of said cam, axially reciprocable piston assemblies in the said cylinder bores, said piston assemblies being in sliding contact with the actuator face of said cam, a plurality of axially yieldable fluid pressure responsive balancing pistons disposed on the interior of the said housing oppositely the said cylinder bores, one such balancing piston for each of the cylinder bores, each of said balancing pistons being in line with one of the said cylinder bores and being of substantially the same diameter as that cylinder bore, said balancing pistons being in sliding contact with the bearing face of said cam normal to the drive shaft axis, a plurality of fluid passages, one from each of the said cylinder bores to the end of its corresponding balancing piston, a disc engaging the said piston assemblies and holding them against the actuator face of the said cam, means on said disc forming a centrally located partial female spherical bearing surface, a sleeve slidably disposed in the said housing coaxial with the drive shaft and surrounding said drive shaft and containing bearing means for one end of the said drive shaft, said sleeve being provided with a male spherical end portion to engage the spherical bearing surface of the said disc, mechanically adjustable positive means disposed in the said housing and acting upon said sleeve to position it so as to hold the said piston assemblies against the actuator face of the said cam by means of the said disc, a plurality of valve chambers in the said housing contiguous to said cylinder bores, one for each of the cylinder bores and coaxial with said cylinder bores, said valve chambers leading from the outside of the housing inwardly to meet the cylinder bores, a central bore in said housing coaxial with said drive shaft and in communication with the said inlet port, an annular groove in said central bore intersecting the said valve chambers and forming a fluid passage from said central bore to the valve chambers, and a plurality of check valve assemblies, one in each of the said valve chambers, each check valve assembly providing unidirectional fluid flow from the said central bore and inlet port to an individual cylinder bore thru multiple axial passages leading from a groove on the periphery of said valve assembly to the end thereof facing the cylinder bore, and each check valve assembly also providing unidirectional fluid flow from the said cylinder bore to an outlet port thru a central axial passage in the said valve assembly.

References Cited by the Examiner

UNITED STATES PATENTS 2,155,455    4/1939    Thoma _____ 103—162
3,016,837    1/1962    Dlugos _____ 103—173

FOREIGN PATENTS 267,265    3/1927    Great Britain.

SAMUEL LEVINE, *Primary Examiner.*

DONLEY J. STOCKING, *Examiner.*

R. M. VARGO, *Assistant Examiner.*